United States Patent [19]

Stirek et al.

[11] Patent Number: 5,044,449

[45] Date of Patent: Sep. 3, 1991

[54] FLEX TINE SOIL MULCHER

[75] Inventors: Louis Stirek; Bruce J. Steffens; Douglas B. Steffen, all of Griswold, Iowa

[73] Assignee: Triple S Engineering, Inc., Griswold, Iowa

[21] Appl. No.: 519,294

[22] Filed: May 4, 1990

[51] Int. Cl.⁵ .................... A01B 23/04; A01B 19/08; A01B 35/20

[52] U.S. Cl. .................... 172/634; 172/739; 172/707; 172/643

[58] Field of Search .............. 172/657, 684, 705, 706, 172/707, 712, 714, 734, 739, 740, 142, 197, 198, 199, 613, 614, 615, 634, 639, 640, 643

[56] References Cited

U.S. PATENT DOCUMENTS

| 555,142 | 2/1896 | Whitman | 172/643 |
|---|---|---|---|
| 3,043,377 | 7/1962 | Urben | 172/657 |
| 3,128,834 | 4/1964 | Birkenbach et al. | 172/639 |
| 3,774,694 | 11/1973 | Gates | 172/657 |
| 3,991,831 | 11/1976 | Foster | 172/614 |
| 4,127,178 | 11/1978 | Blair | 172/615 |
| 4,220,211 | 9/1980 | Hake | 172/643 |

FOREIGN PATENT DOCUMENTS 2029475 3/1980 United Kingdom ............... 172/197

OTHER PUBLICATIONS

Sudenga brochure, Harrow Adjuster, two different pamphlets.

Primary Examiner—Dennis L. Taylor
Assistant Examiner—Spencer Warnick
Attorney, Agent, or Firm—Zarley, McKee, Thomte, Voorhees & Sease

[57] ABSTRACT

This invention relates to a flex tine soil mulcher comprised of a plurality of spaced parallel elongated support arms which extend in a lateral direction with respect to the travel of the device over a cultivated field. A plurality of elongated spaced soil-engaging tines are secured to each of the support arms and extend downwardly therefrom. An upstanding bracket arm is secured to each of the support arms with the bracket arms being in longitudinal alignment. First and second parallel connecting arms are pivotally secured to the bracket arms whereby the attitude of the tines with respect to a vertical plane can be adjusted by longitudinally moving one of the connecting arms with respect to the other. A stop means interconnects the connecting arms to prevent longitudinal movement of one connecting arm with respect to the other in first longitudinal direction, but permits free longitudinal movement between the connecting arms in an opposite longitudinal direction.

8 Claims, 3 Drawing Sheets

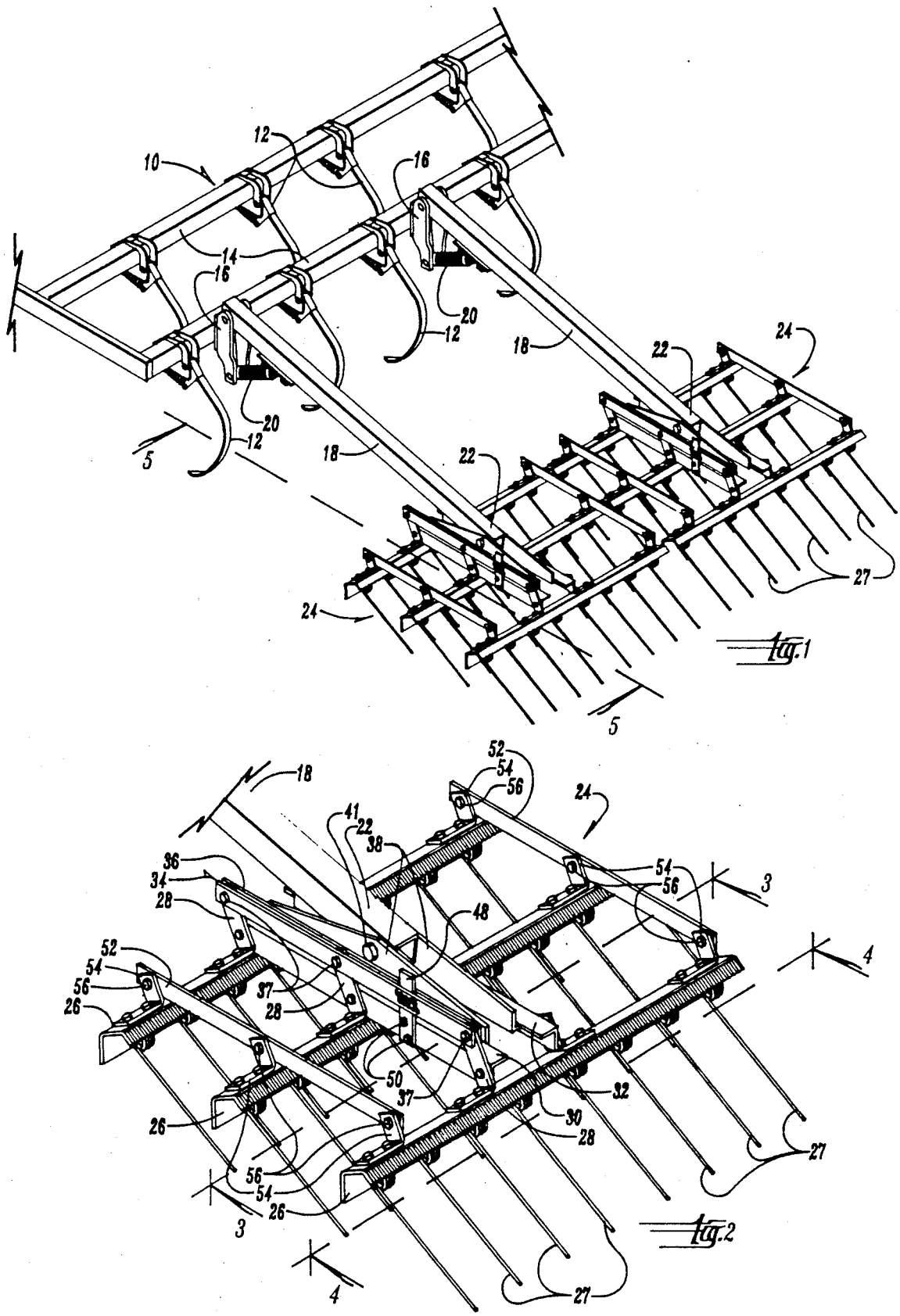

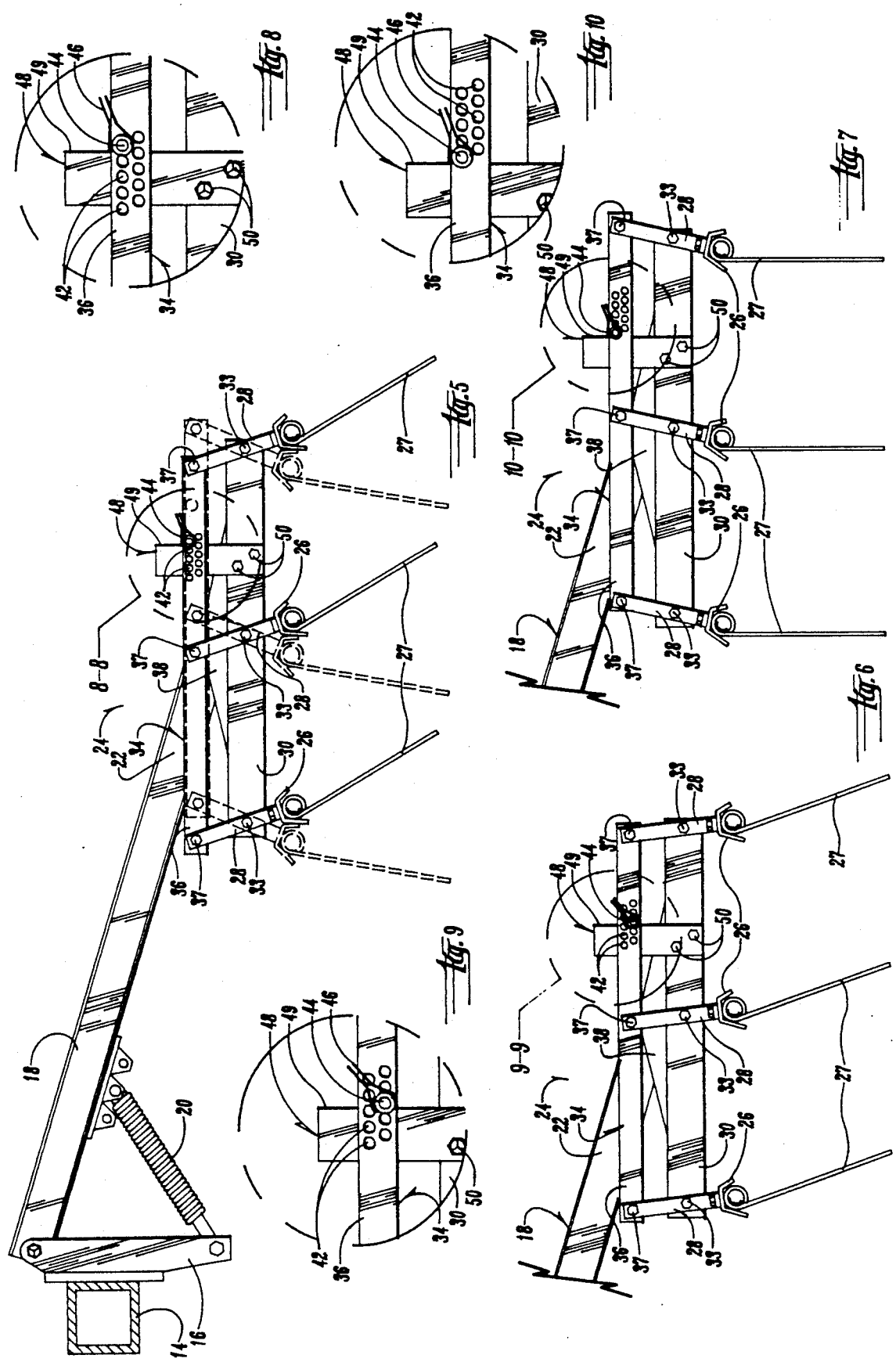

FLEX TINE SOIL MULCHER

BACKGROUND OF THE INVENTION

Flex tine soil mulchers are often mounted on rearwardly extending arms from a field cultivator or the like to mulch and even the cultivated ground behind the field cultivator. These conventional mulchers are equipped with elongated spring-mounted tines which resiliently engage and penetrate the cultivated field.

However, depending upon the amount of residue and the angular position of the tines, conventional soil mulchers often will accumulate field residue, i.e., corn stalks, weeds, bean stubble, etc., and it thereupon becomes necessary to clear this residue from the mulcher for the mulcher to continue to perform its intended function.

The construction of conventional field mulchers normally makes it impossible for the operator of the tractor which is pulling the field cultivator to reverse the motion of the tractor, the field cultivator, and the mulcher to permit the mulcher to free itself from the residue. Further, many soil mulchers either cannot change the angular adjustment of the tines, or adjustment thereof is very difficult.

Therefore, it is a principal object of this invention to provide a soil mulcher that can have its spring-mounted tines easily adjusted so that the angular position thereof can be varied according to field conditions.

A still further object of this invention is to provide a soil mulcher which will permit rearward movement thereof to release accumulated residue without damaging the mulcher.

A still further object of this invention is to provide a flex tine soil mulcher that is extremely durable in spite of the harsh use to which it is placed.

These and other objects will be apparent to those skilled in the art.

SUMMARY OF THE INVENTION

This invention relates to a flex tine soil mulcher comprised of a plurality of spaced parallel elongated support arms which extend in a lateral direction with respect to the travel of the device over a cultivated field. A plurality of elongated spaced soil-engaging tines are secured to each of the support arms and extend downwardly therefrom. An upstanding bracket arm is secured to each of the support arms with the bracket arms being in longitudinal alignment. First and second parallel connecting arms are pivotally secured to the bracket arms whereby the attitude of the tines with respect to a vertical plane can be adjusted by longitudinally moving one of the connecting arms with respect to the other. A stop means interconnects the connecting arms to prevent longitudinal movement of one connecting arm with respect to the other in first longitudinal direction, but permits free longitudinal movement between the connecting arms in an opposite longitudinal direction.

BRIEF DESCRIPTION OF THE DRAWINGS

FIG. 1 is a partial perspective view of two flex tine soil mulchers of this invention secured to the trail arms attached to a conventional field cultivator;

FIG. 2 is a enlarged scale perspective view of one of the field mulchers of FIG. 1;

FIG. 5 is an enlarged scale side elevational view taken on line 5—5 of FIG. 1;

FIG. 6 is a view similar to that of the rearward portion of FIG. 5 with the tines shown in an alternate position of adjustment;

FIG. 7 is a view similar to that of FIG. 6 with the tines shown in a further position of adjustment;

FIG. 8 is an enlarged scale elevational view taken on line 8—8 of FIG. 5;

FIG. 9 is an enlarged scale elevational view taken on line 9—9 of FIG. 6; and

FIG. 10 is an enlarged scale elevational view taken on line 10—10 of FIG. 7.

BRIEF DESCRIPTION OF THE INVENTION

Figure 3:
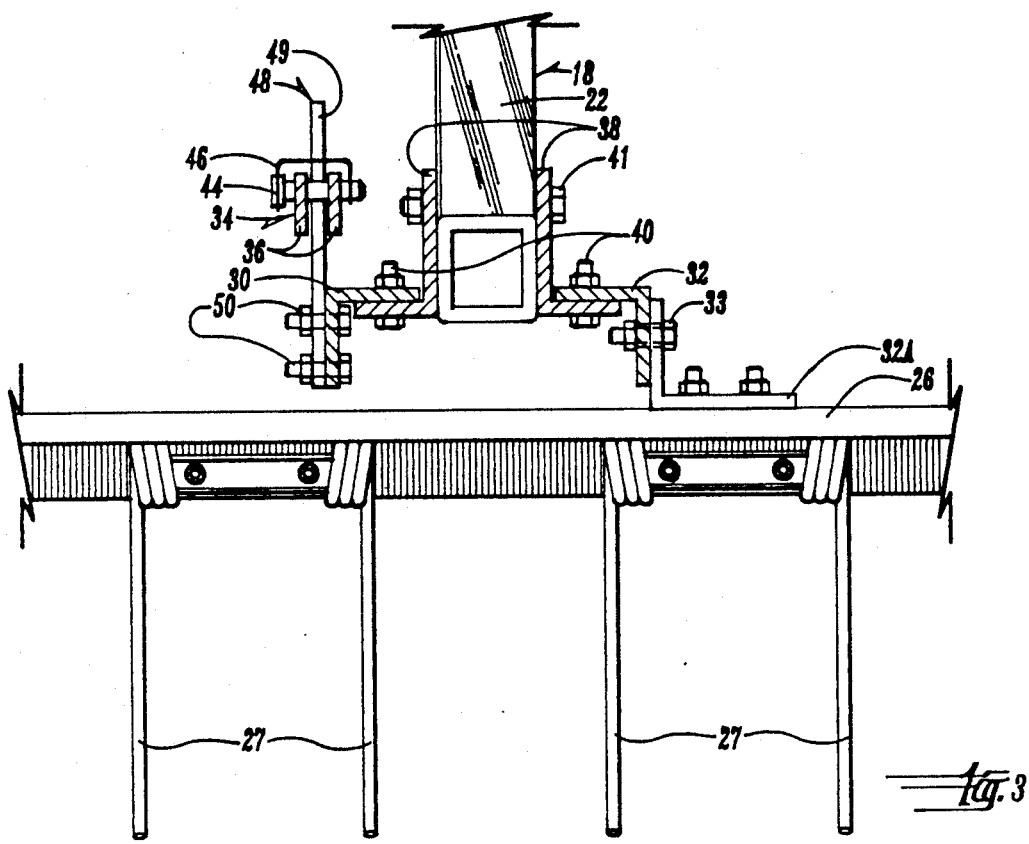
FIG. 3 is a partial sectional view taken on line 3—3 of FIG. 2.

The numeral 10 designates a conventional field cultivator which is used to till the soil preparatory to planting row crops and the like. The field cultivator 10 is equipped with a plurality of spring-mounted harrow elements 12 which are mounted on frame bars 14. Brackets 16 are conventionally mounted on the rearmost frame bar 14 to pivotally support rearwardly extending trail arms 18 which are urged to pivot downwardly by springs 20 which interconnect arms 18 and the lower part of bracket 16. The numerals 22 designate the rearward ends of trail arms 18.

Conventional soil mulchers are normally connected to the rearward ends 22 of trail arms 18. In the drawings, the numeral 24 designates the soil mulcher of this invention. Soil mulcher 24 comprises laterally extending support arms 26 to which are conventionally secured downwardly extending spring tines 27 as best shown in FIG. 2. An L-shaped bracket arm 28 extends upwardly from its point of securement to each of the support arms 26. The bracket arms 28 can be bolted or otherwise secured to the support arms 26 and are arranged in longitudinal alignment.

The mulcher 24 includes first and second connecting arms 30 and 32. Connecting arm 30 is pivotally secured to bracket arms 28 by bolt and bushing assemblies 33 (FIG. 3). Second connecting arm 32 is secured to support arms 26 by clip angles 32A (FIGS. 3 and 4).

A second connecting arm 34 comprised of spaced parallel arm elements 36 (FIG. 3) are pivotally secured to bracket arms 28 by pins 37.

Figure 4:
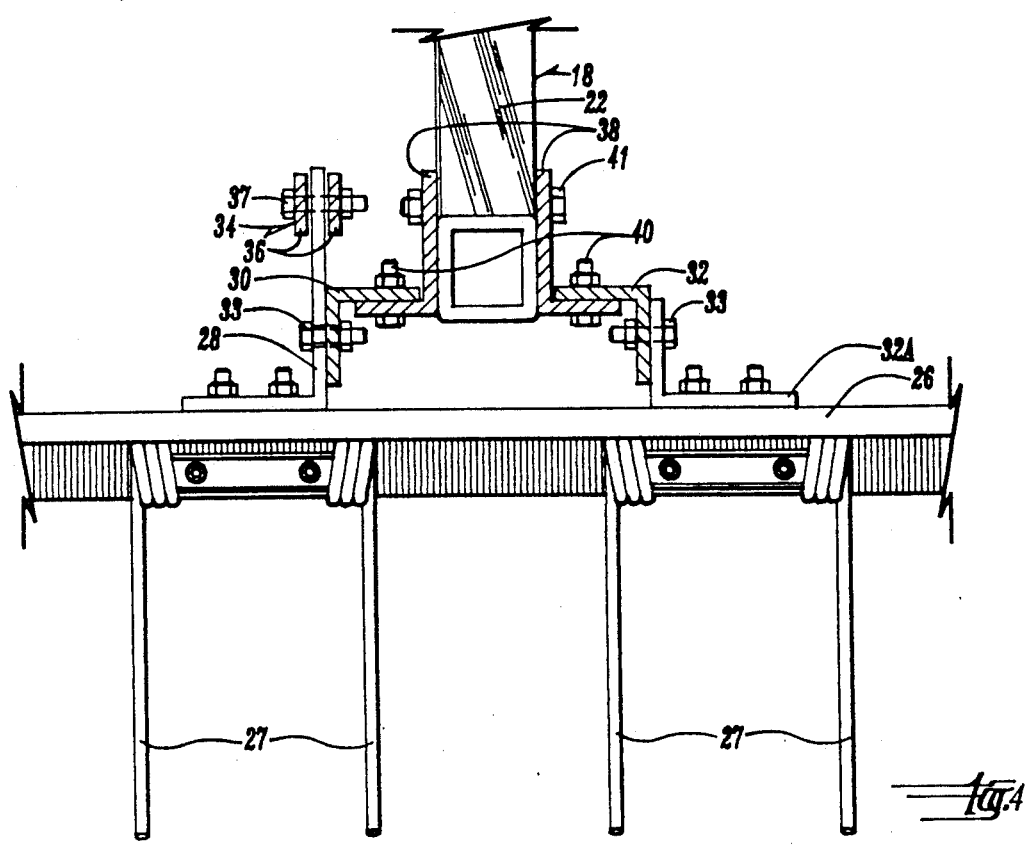
FIG. 4 is an enlarged scale sectional view taken on line 4—4 of FIG. 2.

As best seen in FIGS. 3 and 4, elongated L-shaped brackets 38 are secured to connecting arms 30 and 32, respectively, by bolts 40. Each of the brackets 38 is secured to the rearward end 22 of trail arm 18 by bolt 41. A second bolt, not shown, rigidly maintains the position of brackets 38 with respect to the trail arm 18.

Arm 34 has a plurality of apertures 42 therein which extend through each of the arm elements 36. The apertures in arm elements 36 are aligned with each other to receive a conventional lynch pin 44. Pin 44 has a conventional wire loop 46 thereon (FIG. 3) which can be removed to permit the pin to be selectively inserted in different sets of apertures, but when in place, as shown in FIG. 3, prevents the pin from being removed from the apertures by reasons of vibrations or the like.

An upstanding bar 48 (FIGS. 2 and 3) is rigidly secured by its lower end to connecting arm 30 by bolts 50. As best seen in FIGS. 8, 9 and 10, the rearward edge 49 normally is in abutting relationship with the lynch pin 44 to prevent any forward longitudinal movement of the connecting arm 34 with respect to the upstanding bar 48. However, as will be explained hereafter, when the mulcher 24 is moved in a rearward direction, the arm 34 can move rearwardly longitudinally with respect to bar 48 to effect the release of residue which may have accumulated among the tines 27 of the mulcher 24.

A plurality of stabilizer bars 52 are longitudinally disposed across the outer ends of support arms 26 and are secured thereto by upstanding clip angles 54 by pins 56. Clip angles 54 can be bolted or otherwise secured to the support arms 26. The stabilizer bars 52 merely serve to reinforce the alignment of the support arms 26.

The normal operation of the device of this invention is as follows: The angular position of tines 27 shown in FIG. 6 is reasonably conventional. The angular displacement of the tines in FIG. 6 is controlled by the specific aperture 42 in arm 34 into which the lynch pin 44 is inserted. If the field being cultivated is particularly free from residue, it might be desirable to move the tines 27 to the more vertical position shown in FIG. 7. This is accomplished by removing the lynch pin from the aperture shown in FIG. 6 and moving it to a more forwardly set of apertures shown in FIG. 7. If the field is particularly heavy in residue, the lynch pin 44 may be moved to a more rearwardly set of apertures as shown in FIG. 5. More residue is permitted to pass underneath and between the tines if the tines are moved to a greater angular position as shown in FIG. 5, as compared to the position shown in FIGS. 6 and 7.

In the event that substantial residue is encountered, the tractor operator may back the tractor up slightly. Because the tines 27 are engaged in the soil, or are heavily involved with the accumulated residue, they can easily resist the rearward movement of the tines which causes the tines to move from the position shown by the solid lines in FIG. 5 to the position shown in the dotted lines in FIG. 5. This slight rearward movement of the tractor with respect to the residue will permit the residue to thereupon pass through the tines when the forward motion of the tractor is resumed.

It should be noted that it is very easy under all circumstances to remove the pin 44 from one set of apertures, and insert it into another set of apertures. This is because the pin 44 is only abutted by upstanding bar 48, and does not also extend through aligned apertures in bar 48. Thus, this arrangement of structure greatly facilitates the adjustment feature as compared to devices which cause a pin to be inserted through aligned apertures in a connecting arm and a stop member (bar 48). Further, since the pin 44 does not pass through an interlocking aperture in bar 48, but merely abuts the rearward edge 49 of bar 48, the mulcher 24 can be moved to a rearward position (FIG. 5) without disconnecting any apparatus whatsoever. Again, this is a great advantage over mulchers which, while being adjustable, require the removal of a pin extending through both the connecting arms and the stop member.

This invention greatly enhances the use of flex tine soil mulchers by permitting the easy adjustment of the tines, and by permitting the mulchers to be backed away from accumulated debris. In addition, the bolt and bushing assemblies 33 significantly add to the useful life of the unit by reducing the operational friction of the principal pivot locations. It is therefore seen that this invention will achieve at least all of its stated objectives.

What is claimed is:

1. A flex tine soil mulcher adapted for travel in a longitudinal direction, comprising, a plurality of spaced parallel elongated support arms extending laterally with respect to said longitudinal direction, a plurality of elongated spaced soil engaging tines secured to each of said support arms and extending downwardly therefrom, an upstanding bracket arm secured to each of said support arms;

said bracket arms being in longitudinal alignment with respect to each other, first and second parallel connecting arms pivotally secured to said bracket arms, whereby the angle of said tines with respect to a vertical plane can be adjusted by longitudinally moving one of said connecting arms with respect to the other of said connecting arms, and stop means interconnecting said connecting arms to prevent longitudinal movement of one connecting arm with respect to the other in a first longitudinal direction, but to permit free longitudinal movement therebetween in an opposite longitudinal direction, said stop means is a bar rigidly secured to one of said connecting arms, and extending adjacent said other connecting arm, with abutment means secured to the other connecting arm to engage said bar to prevent longitudinal movement between said connecting arms in said first longitudinal direction.

2. The device of claim 1 wherein said stop means includes adjustment means to permit the longitudinal movement of said connecting arms in said first longitudinal direction to be selectively adjusted.

3. The device of claim 1 wherein said abutment means is a transverse pin extending through one of said connecting arms and abutting said bar.

4. The device of claim 3 wherein said second connecting arm is comprised of a pair of spaced arm elements, said bar extending between said arm elements, and said pin extends through said second connecting arms and abuts said bar.

5. The device of claim 3 wherein a plurality of holes are in said second connecting arm to permit the position of said pin to be selectively adjusted.

6. The device of claim 1 wherein bushing assemblies connect at least said first connecting arm to said bracket arms.

7. The device of claim 1 wherein stabilizer arms are pivotally secured to said support arms adjacent the opposite ends thereof, said support arms being parallel to said connecting arms.

8. A flex tine soil mulcher adapted for travel in a longitudinal direction, comprising, a plurality of spaced parallel elongated support arms extending laterally with respect to said longitudinal direction, a plurality of elongated spaced soil engaging tines secured to each of said support arms and extending downwardly therefrom, an upstanding bracket arm secured to each of said support arms;

said bracket arms being in longitudinal alignment with respect to each other, first and second parallel connecting arms pivotally secured to said bracket arms, whereby the angle of said tines with respect to a vertical plane can be adjusted by longitudinally moving one of said connecting arms with respect to the other of said connecting arms, and stop means interconnecting said connecting arms to prevent longitudinal movement of one connecting arm with respect to the other in a first longitudinal direction, but to permit free longitudinal movement therebetween in an opposite longitudinal direction, said stop means being positionadjustable with respect to said connecting arms to permit the adjustment of the angle of said tines with respect to a vertical plane.

* * * * *